May 25, 1965
A. W. SIMAN ETAL
3,185,388
REFRIGERATION COMPRESSOR VALVE SERVICE
Filed Oct. 2, 1963
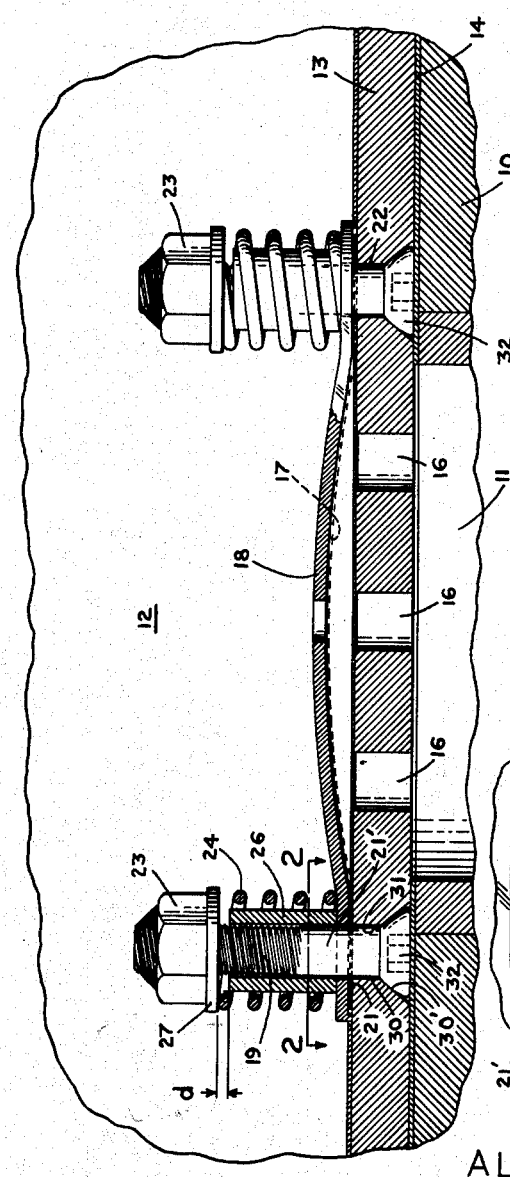
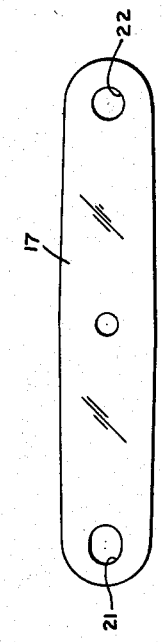
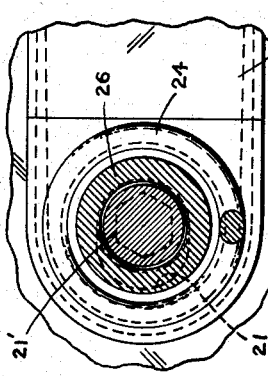
ALFRED W. SIMAN
RUDOLPH STEGMANN JR.
INVENTORS
BY Daniel A. Bohr
atty

3,185,388
REFRIGERATION COMPRESSOR VALVE SERVICE
Alfred W. Siman, Elizabeth, and Rudolph Stegmann, Jr., Dumont, N.J., assignors to Worthington Corporation, Harrison, N.J., a corporation of Delaware
Filed Oct. 2, 1963, Ser. No. 313,338
11 Claims. (Cl. 230—228)

This invention relates to a valve service for use in compressors, and more particularly to a discharge valve arrangement operable to pass compressed fluid therethrough.

Valves of the type presently contemplated in which a thin flexible strip operable with stationary giude posts is the fluid sealing member, are desirable in fluid compressors particularly on the discharge or high pressure side. Primarily, they are small in size permitting maximum utilizaion of the limited space within the compressor, and are extremely simple in construction.

Under normal operating conditions, the valve is subject to continuous flexure so that there is very little wear on cooperating parts. For such operation, actuation of the valve is confined to the thin valve strip or reed which is caused to flex in response to the pressure within the compressor head, thereby exposing the valve part.

Such valves however, although possessing many desirable characteristics, embody certain disadvantages both in structure and operation.

For one thing, the normal valve arrangement is such that upon an abnormal increase in pressure within the compression chamber, the valve reed and back up member may be displaced with such force as to be damaged or to cause damage to other members such as the valve guide posts.

Another malfunction resulting from undue pressure surges, is that the elongated reed and/or back up member may become offset so as to bind with the valve post thus rendering the compressor inoperative.

Since there is substantially continuous movement between the operating valve strip and stationary valve guide posts, there will be considerable amount of wear under adverse loading conditions and even under usual normal operating conditions. Since the valve requires periodic repair or replacement, this flexible member must be so retained in the valve assembly as to be readily disengaged, preferably with a minimum amount of disassembly of related valve parts.

A further disadvantage of a minor degree peculiar to this type valve arrangement is that because of the slidable relationship between the valve strip and the guide post, the latter with respect to the valve plate must be relatively accurately positioned. Where an undue amount of misalignment is found in the relationship of the respective guide posts, the aforementioned binding of the valve strip upon excessive movement will be prevalent.

We have overcome the above mentioned problem by providing a novel valve assembly embodying features which render the valve resistant to severe shock and possible damage. The structural configuration and cooperative relation of the members assure that the shock effects will be readily absorbed and will not damage or deform operating elements. The operating valve strip is provided with a rigid, though movable back-up member which in turn is supported by a spring connection with a tubular compression element on the guide post.

It is therefore an object of the present invention to provide an improved discharge valve assembly for use in gas compressors, said assembly being particularly adapted to resist and absorb sudden shocks imposed on the valve members.

A further object of the invention is to provide a valve mechanism of the type described which employs a minimum number of parts, which is simple in construction, and which avoids misalignment and consequent binding of said parts during operation of the compressor.

A still further object is to provide a strip type valve which may be simply and easily replaced on such occasions as is required by excessive wear or damage to the valve assembly.

Another object of the invention is to provide a shock resistant strip or reed type valve which may be economically manufactured due to in-built flexibility within the valve which precludes the need for accurate dimensioning of mating or cooperating parts.

Still another object of the invention is to provide a valve of the type contemplated in which movable and non-movable members are cooperatively engaged and guided with respect to a valve port in such manner that the guide members are permitted to adjust to accommodate any excessive force exerted thereon which might tend to cause a misfunction of the valve strip with respect to the discharge openings.

Further objects of the invention will become apparent to one skilled in the art from the accompanying description made with reference to the figures in which a preferred embodiment of the invention is shown.

FIGURE 1 is a view in cross-section of a preferred embodiment of the invention shown assembled to a compressor head.

FIGURE 2 is a segmentary view on an enlarged scale and in cross-section taken along line 2—2 of FIGURE 1.

FIGURE 3 illustrates an embodiment of the valve strip shown in FIGURE 1.

Referring to the drawings, FIGURE 1 illustrates in part, a compressor of a type familiar in the art including a cylinder block 10 having at least one cylinder bore 11 in which a piston, not presently shown, is reciprocably positioned to compress a gas such as vaporous refrigerant. The outer surface of cylinder block 10 is provided with a discharge manifold 12 bolted or held firmly in place by suitable means to form a fluid tight closure across outlets of the respective cylinders. A valve plate 13 is fastened to the cylinder block outer surface forming a ported closure to the respective cylinder bores.

While only a single valve plate 13 is presently shown, the valve plate may actually include a plurality of valves or may embody individual valve plates provided at the separate cylinder bores. To maintain a gas tight seal between the close fitting valve plate 13 and cylinder block 10, a gasket 14 is compressed therebetween.

Valve plate 13 is provided with a plurality of discharge ports 16, communicating cylinder bore 11 with the manifold 12. These discharge ports may be circular openings, or may assume an elongated configuration, the number of openings being dependent on the compression to be achieved in the cylinder bore and the physical characteristics of the discharge valve assembly.

Under normal operating conditions, refrigerant vapor is drawn through the compressor suction to an inlet port not presently shown, and introduced to the cylinder bore 11. On the down or intake stroke of the piston, discharge ports 16 will be closed by strip 17 due partially to the suction caused by the retreating piston, and also due to the fact that the valve's flexible member 17 will tend to assume its normal, flat position across the discharge ports 16. On the compression stroke, the piston advances upwardly toward the cylinder head thus compressing refrigerant against discharge ports 16 until a predetermined pressure has been reached in the cylinder. Thereafter, the flexible member 17 will be displaced from the discharge ports 16 permitting high pressure refrigerant to pass into the discharge manifold 12.

The valve assembly is comprised basically of two members, namely, flexible valve strip 17, and a relatively rigid back-up bar 18. The entire assembly is held in place on valve 13 by a plurality of posts or guide pins 19 carried in the valve plate in such a manner as will be hereinafter described more fully, to permit a degree of movement of said pins under the influence of the valve's moving elements.

The primary element in the valve assembly is valve strip 17 which in its normal down position provides a substantially gas tight closure to the discharge ports 16. Although but a single valve strip is presently shown, it will be understood that a plurality of such strips may be employed and function in a manner similar to the function of the single unit.

Valve strip 17 is formed preferably from a durable, although resilient, thin material. Following the teaching of the prior art, this member may be formed of spring steel, Phosphor bronze, or the like, which metals are particularly adapted to retain their resilience under the extreme conditions of constant flexure as experienced in the present arrangement.

As a matter of economy and practicality, valve strip 17 is preferably of uniform thickness throughout, however for certain applications the thickness may be varied as a design expedient.

Valve strip as shown in FIGURE 3 comprises a generally elongated member having an opening formed in each terminal end to permit sliding engagement of the strip with guide posts or pins 19. As presently illustrated, at least one of the valve strip openings 21 is slightly elongated while the other opening 22 may be merely a circular hole.

Back-up bar 18 comprises an elongated member having substantially the same general shape as the valve strip 17 and so formed to define a bowed or arcuate configuration approximating the disposition of valve strip 17 when the latter is displaced from its normal position covering discharge ports 16. Bar 18 is of a relatively heavy gauge metal so as not to deform under abnormally high, or surging pressures within the cylinder bore 11. The back-up bar is provided with a pair of spaced openings disposed one at each end of the bar and adapted to be slidably received on guide pins 19.

The lower or underside of back-up bar 18 is channeled to provide a cavity at each end defined by a raised lip 20 adjacent the flattened portion at the respective guide pins. The channels at either end are sufficiently deep to permit valve strip 17 to be slidably inserted and retained within the cavity when the back-up bar is normally urged downward into position in contact with valve plate 13.

Although the end openings of the back-up bar 18 may be slightly elongated to permit a degree of lateral movement with respect to the guide pins 19, said holes shown in the figures may be circular in cross-section to permit a sliding fit with at least a portion of the shank 21' of guide pin 19.

Guide posts 19 comprise a plurality of upright members, but preferably as in the instant case, a pair of spaced apart posts is needed to properly engage the elongated valve assembly. Guide post 19 includes an elongated member having shank 21' with a head 32 formed at one end while the opposed end of the head is preferably threaded. A nut 23 threadedly received on said other end locates a coil spring 24 in a normal, slightly compressed position in accordance with the pressure being exerted by fluid pressure in cylinder bore 11.

A washer 7 at the lower side of the nut provides a radial shoulder against which spring 24 bears.

Nut 23 may be rotatably carried on the threaded end of guide pin 19 or properly positioned with the aid of a lock nut or similar device said nut may alternatively be fixed into place by welding or soldering to the pin 19. This latter practice however is not preferred since it prohibits disassembly of the valve assembly when it is necessary to replace certain parts thereof.

Positioning of spacer 26 with respect to back-up bar 18 is such that the spacer is slidably movable along shank 21 for at least a short distance until the spacer abuts the underside of washer 27. Such abutment results when excessive pressure in the cylinder bore, such as by a surge of liquid, causes back-up bar 18 to be displaced an excessive amount. This amount will be approximately equivalent to the distance "$d$" between the lower face of washer 27 and the upper face of spacer 26.

The head 32 or lower end of the guide post 19 is retained within valve plate 13 in such manner that when properly held in an erect position by the action of coil spring 24, the guide pin will normally be in a substantially perpendicular relationship with the upper surface of the valve plate 13.

The under surface of plate 13 adjacent gasket 14 is provided with a passage 30 extending therethrough and of sufficient size to slidably receive shank 21' of guide pin 19. Said passage includes a circular opening 31 of larger diameter than shank 21 to provide a clearance space therebetween. A countersunk or tapered portion 30' is substantially concentric with opening 31 and adapted to engage the mating lower surface of the guide pin head 32.

As the guide pin 19 is urged upwardly by spring 24, head 32 will be in abutting engagement with the surface of countersunk opening 30'.

While head 32 is presently shown as embodying a substantially frusto-conical configuration, the function served by said head is to pivotally engage the countersunk portion of opening 32 regardless of the attitude of the guide pin with respect to the surface of plate 13. Thus in effect, engagement between the head 32 and the guide plate 13 is that of a pivotal joint. Thus as the guide pin is displaced from a substantially vertical position, head 32 will tend to maintain at least line contact with adjacent walls of the countersunk portion of opening 30'.

Head 32 of guide post 19 may be recessed with socket 33, to permit adjustment of the entire assembly. In the fully assembled position, the head is preferably disposed entirely within opening 32 so that the lower surface of plate 13 will be readily received on the upper surface of the cylinder block 10 and gasket 14.

Spacer 26 includes a tubular metallic member whose primary function is to transmit pressure to the guide pin 19. Thus, under sudden pressure surge, spacer 26 engaged by strip 18, will compressively deform against washer 27. Simultaneously, the shank of post 19 will be subjected to tensile stress and caused to deform longitudinally.

The combined strain imposed on spacer 26 and post 19 is substantially equivalent to providing an elongated post being approximately double the length of a single post. In terms defined by standard strength of material terminology:

$$\text{deflection} = \frac{PL}{AE}$$

where:

$P$ = shock load imposed
$L$ = length of the stressed member (19 and 26)
$A$ = constant area of the stressed member
$E$ = modulus of elasticity of the metal Since total deflection is approximately proportionate to length of the deflected member, by effectively increasing said length, the amount of deflection and thus the shock load which may be safely tolerated is increased.

Guide member 26 and post 19 need not be of the same material nor of equivalent cross-sectional area. However, to equally divide the shock load, said members should be so designed, to complement each other and to avoid permanent deformation of either under extreme loading conditions.

In assembling the valve components prior to incorporation into a compressor head, the respective guide posts 19 are first inserted into openings 30 and 31 such that the shank 21' protrudes from the upper surface of guide plate 13. Valve strip 17 and back-up bar 18 are slidably positioned on the guide posts, preferably with the elongated hole 21 and the corresponding elongated opening in back-up bar 18 at the same end. Spacer 26 is thereafter positioned on shank 21' followed by washer 26 and coil spring 24. Nut 23 is threadedly moved along the shank 24 engagement with the washer 26 to bear against and compress coil spring 24 with a predetermined force.

Adjustment of nut 23 may be made in accordance with the length of spacer 26 or with the desired distance "d" be maintained between the spacer and the washer. While this initial spacing of nut 23 will not affect the opening pressure to be exerted by the valve strip 17, it will affect the resilient resistance offered by the back-up bar 18 when force is exerted due to an abnormal cylinder pressure.

With nut 23 properly in place, the latter may be fixedly positioned with the aid of a second or lock nut or alternately as shown in FIGURE 1 by means of a weld or soldered joint at the upper surface thereof.

With the compressor handling a vaporizable refrigerant, each upward stroke of the piston exerting pressure against the lower side of valve strip 17 will cause the latter to raise up from a normally closed position, permitting the flow of gaseous refrigerant from the cylinder bore. In rising to its displaced position, valve strip 17 will remain laterally fixed at one side by reason of the close fit between hole 22 and guide post shank 21. However, the other end of the valve strip containing the elongated hole 21 in engagement with shank 21 will permit lateral movement of strip 17 along the upper surface of valve plate 13.

When, in the event of an excessive pressure within the cylinder bore valve strip 17 is forced against back-up bar 18 sufficiently to move the latter against the pressure of spring 24, there is a likelihood that upon return of the back-up spring to its normal position, back-up bar 18 will become misaligned with at least one guide post and in becoming skewed from its proper position becomes wedged.

Prior to the advent of the present invention, such displacement of the back-up bar would eventually cause a malfunction in the valve service requiring replacement or at least shutting down of the machine. However, by means of the pivotally mounted guide post 19, in the event wedging action by the back-up bar 18, one or both guide posts can be deflected outwardly a sufficient amount to permit bar 18 to slide freely to its normal position in engagement with the valve strip at the valve plate 13 upper surface.

When, after usage, it becomes necessary to replace worn or broken members in the valve assembly, it is only necessary to remove nut 23 and to disassamble the valve mechanism to remove the defective part. This removal, it will be understood, is facilitated by the use of a guide post arrangement other than the one which is presently shown with the weld or soldered joint at the top thereof. For example, with nut 23 complemented by a second locking nut, removal and replacement of the aforementioned effective part is readily accomplished in a short time and with little stoppage of the compressor.

While we have described the present invention in terms of the embodiment thereof shown in the figures, it will be understood by one skilled in the art that certain variations and modifications may be made in the apparatus without departing from the spirit and scope of the invention.

What is claimed is:

1. In a compressor having a head, a cylinder in the head, and a manifold connected to the head to receive fluid discharged from the cylinder;

(a) a valve plate carried on the head and having means forming a passage therein communicating the cylinder with the manifold,
(b) guide means supportably extending from the valve plate,
(c) a closure assembly sildably mounted on said guide means and being biased toward the valve plate to provide a closure to the means forming said passage therein for controlling flow of fluid from the cylinder,
(d) at least a portion of said guide means being non-rigidly positioned in the valve plate to permit deflection of the guide means under the influence of pressure exerted by the closure assembly.

2. In a compressor as defined in claim 1 wherein said guide means includes:
(a) a plurality of guide members depending from the plate and being disposed in substantial parallel relationship one to the other,
(b) at least one of said plurality of guide members being pivotally positioned in the plate to permit deflection of said member into non-parallel relationship with other of said guide members under the influence of pressure exerted by the closure assembly.

3. In a compressor as defined in claim 1 including spring means connected to said guide means and biasing the closure assembly toward the valve plate.

4. In a compressor as defined in claim 1 wherein the closure assembly comprises:
(a) a thin flexible member disposed adjacent to the valve plate and providing a closure to the means forming a passage in the plate,
(b) a rigid member positioned adjacent at least a portion of said flexible member, to limit deflection of the latter member, under pressure in a compressor cylinder.

5. In a compressor substantially as defined in claim 2 wherein:
(a) at least one of said plurality of guide members includes an elongated pin having a head at one end thereof pivotally retained in the valve plate.

6. In a compressor substantially as defined in claim 2 wherein said valve plate includes:
(a) a passage means extending therethrough including a first portion having a greater diameter than the second portion,
(b) at least one of said plurality of guide means including a pin disposed in registry with said passage means second portion and having an enlarged head received in said first portion to permit deflection of the pin from a position normal to the valve plate surface.

7. A strip valve assembly for use in controlling flow of compressible medium through a compressor head discharge port including:
(a) a base plate carried on the discharge head,
(b) means in said base plate forming a passage in connection with the compression chamber,
(c) valve means cooperative with said means forming a passage, and operable therewith defining a displaceable closure,
(d) guide posts carried on said base plate and extending therefrom,
(e) said valve means slidably carried on the guide posts permitting deflection of the valve means under the influence of excessive force in the compression head.
(f) at least a portion of said guide means being non-rigidly positioned in the valve plate to permit deflection of the guide means under the influence of pressure exerted by the displaceable closure,
(g) spring means carried on the guide posts and compressibly urging the valve means into contact with said means in the base plate forming a passage,
(h) a spacer received on the guide posts,
(i) said spacer being axially compressible under force exerted by the vlave means at excessive pressure in the compression head.

8. In a strip valve assembly as defined in claim 7 wherein:
   (a) said spacer includes an elongated tubular member slidably carried on the pin.

9. In a strip valve assembly as defined in claim 8 where:
   (a) said spacer received on the guide pins includes an elongated tubular member substantially surrounding said pin.

10. In a strip valve assembly as defined in claim 7 wherein:
    (a) said valve spring means includes a coil spring surrounding the pin and engaging the upper surface of the valve assembly.

11. In a strip valve assembly as defined in claim 10 wherein:
    (a) said spacer is disposed on the valve pin internally of the coil spring.

References Cited by the Examiner

UNITED STATES PATENTS

| | | | |
|---|---|---|---|
| 2,353,751 | 7/44 | Osgood | 137—516.11 |
| 2,372,938 | 4/45 | Doeg | 230—228 |
| 2,752,943 | 7/56 | Doeg | 137—512.15 |
| 2,798,505 | 7/57 | Kehler | 137—516.11 |
| 2,970,608 | 2/61 | Doeg | 137—516.11 |
| 2,981,462 | 4/61 | Niedermayer | 230—228 |
| 3,039,487 | 6/62 | Doeg | 137—516.11 |

FOREIGN PATENTS 129,232   7/19   Great Britain.

LAURENCE V. EFNER, *Primary Examiner.*

ROBERT M. WALKER, *Examiner.*